(12) United States Patent
Tani et al.

(10) Patent No.: US 7,944,482 B2
(45) Date of Patent: May 17, 2011

(54) PIXEL INFORMATION READOUT METHOD AND IMAGE PICKUP APPARATUS

(75) Inventors: Kuniyuki Tani, Ogaki (JP); Tohru Watanabe, Oogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 326 days.

(21) Appl. No.: 11/826,865

(22) Filed: Jul. 19, 2007

(65) Prior Publication Data

US 2008/0024631 A1 Jan. 31, 2008

(30) Foreign Application Priority Data

Jul. 28, 2006 (JP) .................................. 2006-207218
Jul. 28, 2006 (JP) .................................. 2006-207219

(51) Int. Cl.
H04N 5/228 (2006.01)
H04N 5/235 (2006.01)

(52) U.S. Cl. ..................... 348/222.1; 348/362

(58) Field of Classification Search ............. 348/208.12, 348/208.4, 222.1, 241, 294, 362; 345/418–424
See application file for complete search history.

(56) References Cited

U.S. PATENT DOCUMENTS

| | | | |
|---|---|---|---|
| 6,686,960 B2 * | 2/2004 | Iizuka | 348/273 |
| 6,847,398 B1 * | 1/2005 | Fossum | 348/296 |
| 7,030,911 B1 * | 4/2006 | Kubo | 348/221.1 |
| 7,242,432 B2 * | 7/2007 | Watanabe | 348/333.11 |
| 7,263,172 B2 * | 8/2007 | Grunau | 378/163 |
| 7,561,195 B2 * | 7/2009 | Watanabe | 348/294 |
| 7,656,455 B2 * | 2/2010 | Hatano | 348/361 |
| 2004/0125223 A1 * | 7/2004 | Iizuka | 348/272 |

FOREIGN PATENT DOCUMENTS

| | | |
|---|---|---|
| JP | 2002-094883 | 3/2002 |
| JP | 2002-369083 | 12/2002 |
| JP | 2003-189186 | 7/2003 |
| JP | 2003-224857 | 8/2003 |
| JP | 2004-147278 | 5/2004 |
| JP | 2004-266369 | 9/2004 |
| JP | 2005-262610 | 9/2005 |
| JP | 2005-269452 | 9/2005 |
| JP | 2006-157124 | 6/2006 |

(Continued)

OTHER PUBLICATIONS

Japanese Notification of Reason(s) for Refusal, w/ English translation thereof, issued in Patent Application No. JP 2006-207218 dated on Jul. 15, 2008.

(Continued)

*Primary Examiner* — Lin Ye
*Assistant Examiner* — Trung Diep
(74) *Attorney, Agent, or Firm* — McDermott Will & Emery LLP

(57) ABSTRACT

When successively reading out pixel information from an image region, where image pickup devices are arranged two-dimensionally, which is divided into a plurality of sub-regions, a readout unit inserts pixel information on pixels of interest in the respective sub-regions successively at predetermined intervals and reads them out. A control unit generates a frame from the pixel information, on pixels of interest inserted at the predetermined intervals, which has been read out from the readout unit. The control unit grasps a tendency of a picked-up image from the generated frame and performs a predetermined adaptive control according to the grasped tendency.

15 Claims, 16 Drawing Sheets

FOREIGN PATENT DOCUMENTS

WO    WO 2006/048987    5/2006

OTHER PUBLICATIONS

Japanese Notification of Reason(s) for Refusal, w/ English translation thereof, issued in Patent Application No. JP 2006-207219 dated on Jul. 15, 2008.

Japanese Decision of Refusal, w/ English translation thereof, issued in Japanese Patent Application No. JP 2006-207219 dated Aug. 17, 2010.

Japanese Decision to Dismiss the Amendment, w/ English translation thereof, issued in Japanese Patent Application No. JP 2006-207219 dated Aug. 17, 2010.

Japanese Notification of Reasons for Refusal, with English Translation, issued in Japanese Patent Application No. JP 2006-207219, dated Aug. 11, 2009.

Japanese Notification of Reasons for Refusal, with English Translation, issued in Japanese Patent Application No. JP 2006-207218, dated Aug. 11, 2009.

* cited by examiner

FIG.3

|   | 1 | 2 | 3 | 4 | 5 | 6 | 7 | 8 | 9 | 10 | 11 | 12 |    |
|---|---|---|---|---|---|---|---|---|---|----|----|----|----|
| 1 | 1 | 2 | 3 | 4 | 5 | 6 | 7 | 8 | 9 | 10 | 11 | 12 | 1 |
|   | 13 | 14 | 15 | 16 | 17 | 18 | 19 | 20 | 21 | 22 | 23 | 24 | 2 |
|   | 25 | 26 | 27 | 28 | 29 | 30 | 31 | 32 | 33 | 34 | 35 | 36 | 3 |
|   | 37 | 38 | 39 | 40 | 41 | 42 | 43 | 44 | 45 | 46 | 47 | 48 | 4 |
|   | 49 | 50 | 51 | 52 | 53 | 54 | 55 | 56 | 57 | 58 | 59 | 60 | 5 |
|   | 61 | 62 | 63 | 64 | 65 | 66 | 67 | 68 | 69 | 70 | 71 | 72 | 6 |
|   | 73 | 74 | 75 | 76 | 77 | 78 | 79 | 80 | 81 | 82 | 83 | 84 | 7 |
|   | 85 | 86 | 87 | 88 | 89 | 90 | 91 | 92 | 93 | 94 | 95 | 96 | 8 |
|   | 97 | 98 | 99 | 100 | 101 | 102 | 103 | 104 | 105 | 106 | 107 | 108 | 9 |
|   | 109 | 110 | 111 | 112 | 113 | 114 | 115 | 116 | 117 | 118 | 119 | 120 | 10 |
|   | 121 | 122 | 123 | 124 | 125 | 126 | 127 | 128 | 129 | 130 | 131 | 132 | 11 |
|   | 133 | 134 | 135 | 136 | 137 | 138 | 139 | 140 | 141 | 142 | 143 | 144 | 12 |

| 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|---|---|---|---|---|---|---|
| 25 | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 |
| 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 |
| 73 | 74 | 75 | 76 | 77 | 78 | 79 | 80 | 81 | 82 | 83 | 84 | 85 | 86 | 87 | 88 | 89 | 90 | 91 | 92 | 93 | 94 | 95 | 96 |
| 97 | 98 | 99 | 100 | 101 | 102 | 103 | 104 | 105 | 106 | 107 | 108 | 109 | 110 | 111 | 112 | 113 | 114 | 115 | 116 | 117 | 118 | 119 | 120 |

|  | 1 | 2 | 3 | 4 | 5 | 6 | 7 | 8 | 9 | 10 | 11 | 12 |  |
|---|---|---|---|---|---|---|---|---|---|---|---|---|---|
| S1 | 1 | 2 | 3 | 4 | 5 | 6 | 7 | 8 | 9 | 10 | 11 | 12 | 1 |
|  | 13 | 14 | 15 | 16 | 17 | 18 | 19 | 20 | 21 | 22 | 23 | 24 | 2 |
|  | 25 | 26 | 27 | 28 | 29 | 30 | 31 | 32 | 33 | 34 | 35 | 36 | 3 |
|  | 37 | 38 | 39 | 40 | 41 | 42 | 43 | 44 | 45 | 46 | 47 | 48 | 4 |
|  | 49 | 50 | 51 | 52 | 53 | 54 | 55 | 56 | 57 | 58 | 59 | 60 | 5 |
|  | 61 | 62 | 63 | 64 | 65 | 66 | 67 | 68 | 69 | 70 | 71 | 72 | 6 |
|  | 73 | 74 | 75 | 76 | 77 | 78 | 79 | 80 | 81 | 82 | 83 | 84 | 7 |
|  | 85 | 86 | 87 | 88 | 89 | 90 | 91 | 92 | 93 | 94 | 95 | 96 | 8 |
|  | 97 | 98 | 99 | 100 | 101 | 102 | 103 | 104 | 105 | 106 | 107 | 108 | 9 |
|  | 109 | 110 | 111 | 112 | 113 | 114 | 115 | 116 | 117 | 118 | 119 | 120 | 10 |
|  | 121 | 122 | 123 | 124 | 125 | 126 | 127 | 128 | 129 | 130 | 131 | 132 | 11 |
|  | 133 | 134 | 135 | 136 | 137 | 138 | 139 | 140 | 141 | 142 | 143 | 144 | 12 |

| 131 | 118 | 144 | 123 | 112 | 150 | 113 | 130 | 132 |
|---|---|---|---|---|---|---|---|---|
| 128 | 115 | 141 | 120 | 119 | 137 | 120 | 127 | 129 |
| 125 | 112 | 138 | 117 | 126 | 124 | 127 | 124 | 126 |
| 122 | 109 | 135 | 114 | 133 | 111 | 134 | 121 | 123 |
| 95 | 82 | 108 | 85 | 106 | 84 | 107 | 94 | 96 |
| 92 | 79 | 105 | 81 | 103 | 81 | 104 | 91 | 93 |
| 89 | 76 | 102 | 78 | 100 | 78 | 101 | 88 | 90 |
| 86 | 73 | 99 | 75 | 97 | 75 | 98 | 85 | 87 |
| 59 | 46 | 72 | 48 | 70 | 33 | 71 | 58 | 60 |
| 56 | 43 | 69 | 45 | 67 | 35 | 68 | 55 | 57 |
| 53 | 40 | 66 | 42 | 64 | 37 | 65 | 52 | 54 |
| 50 | 37 | 63 | 39 | 61 | 39 | 62 | 49 | 51 |
| 23 | 10 | 36 | 12 | 34 | 11 | 35 | 22 | 24 |
| 20 | 7 | 33 | 9 | 31 | 8 | 32 | 19 | 21 |
| 17 | 4 | 30 | 6 | 28 | 5 | 29 | 16 | 18 |
| 14 | 1 | 27 | 3 | 25 | 2 | 26 | 13 | 15 |

FIG.7

| f9 | | | |
|---|---|---|---|
| 15 | 51 | 87 | 123 |
| 18 | 54 | 90 | 126 |
| 21 | 57 | 93 | 129 |
| 24 | 60 | 96 | 132 |

...

| f3 | | | |
|---|---|---|---|
| 27 | 63 | 99 | 135 |
| 30 | 66 | 102 | 138 |
| 33 | 69 | 105 | 141 |
| 36 | 72 | 108 | 144 |

| f2 | | | |
|---|---|---|---|
| 1 | 37 | 73 | 109 |
| 4 | 40 | 76 | 112 |
| 7 | 43 | 79 | 115 |
| 10 | 46 | 82 | 118 |

| f1 | | | |
|---|---|---|---|
| 14 | 50 | 86 | 122 |
| 17 | 53 | 89 | 125 |
| 20 | 56 | 92 | 128 |
| 23 | 59 | 95 | 131 |

FIG.13

| 1 | 2 | 3 | 14 | 4 | 5 | 6 | 17 | 7 | 8 | 9 | 20 | 10 | 11 | 12 | 23 |
|---|---|---|---|---|---|---|---|---|---|---|---|---|---|---|---|
| 13 |  | 15 | 50 | 16 |  | 18 | 53 | 19 |  | 21 | 56 | 22 |  | 24 | 59 |
| 25 | 26 | 27 | 86 | 28 | 29 | 30 | 89 | 31 | 32 | 33 | 92 | 34 | 35 | 36 | 95 |
| 37 | 38 | 39 | 122 | 40 | 41 | 42 | 125 | 43 | 44 | 45 | 128 | 46 | 47 | 48 | 131 |
| 49 |  | 51 | 14 | 52 |  | 54 | 17 | 55 |  | 57 | 20 | 58 |  | 60 | 23 |
| 61 | 62 | 63 | 50 | 64 | 65 | 66 | 53 | 67 | 68 | 69 | 56 | 70 | 71 | 72 | 59 |
| 73 | 74 | 75 | 86 | 76 | 77 | 78 | 89 | 79 | 80 | 81 | 92 | 82 | 83 | 84 | 95 |
| 85 |  | 87 | 122 | 88 |  | 90 | 125 | 91 |  | 93 | 128 | 94 |  | 96 | 131 |
| 97 | 98 | 99 | 14 | 100 | 101 | 102 | 17 | 103 | 104 | 105 | 20 | 106 | 107 | 108 | 23 |
| 109 | 110 | 111 | 50 | 112 | 113 | 114 | 53 | 115 | 116 | 117 | 56 | 118 | 119 | 120 | 59 |
| 121 |  | 123 | 86 | 124 |  | 126 | 89 | 127 |  | 129 | 92 | 130 |  | 132 | 95 |
| 133 | 134 | 135 | 122 | 136 | 137 | 138 | 125 | 139 | 140 | 141 | 128 | 142 | 143 | 144 | 131 |

FIG.15

| G | R |
|---|---|
| B | G |

FIG.16

PIXEL INFORMATION READOUT METHOD AND IMAGE PICKUP APPARATUS

CROSS-REFERENCE TO RELATED APPLICATIONS

This application is based upon and claims the benefit of priority from the prior Japanese Patent Applications No. 2006-207218, filed Jul. 28, 2006, and Japanese Patent Application No. 2006-207219, filed Jul. 28, 2006, the entire contents of which are incorporated herein by reference.

BACKGROUND OF THE INVENTION

1. Field of the Invention

The present invention relates to a pixel information readout method for reading pixel information from an image pickup device, such as a CMOS (Complementary Metal-Oxide Semiconductor) image sensor, and an image pickup apparatus therefor.

2. Description of the Related Art

CMOS image sensors, mounted on digital still cameras, digital video cameras, mobile-phone cameras, web-cameras for video chat, and the like, are coming into ever-wider use today. And digital still cameras and the like often feature a variety of adaptive controls, which include exposure time control, white balance control, and movement detection for camera shake compensation. For these adaptive controls to function properly, it is necessary that information on brightness and color be obtained from an entire screen as image processing parameters.

Thus, to grasp a general tendency of a whole image, pixel information in a lower part thereof cannot be ignored when pixel information on the whole image picked up by a CMOS image sensor or the like is read out. And it takes time to read an image successively from top to bottom to acquire image processing parameters. Moreover, the timing for starting each of such adaptive controls comes only after image processing parameters have been acquired from the entire read-out image and compensation values have been generated by referring thereto.

SUMMARY OF THE INVENTION

A pixel information readout method according to one embodiment of the present invention is such that a pixel region, where image pickup devices are arranged two-dimensionally, is divided into a plurality of sub-regions, and when image information on the pixel region is successively read out, pixel information on a pixel of interest in each of the sub-regions is successively inserted at predetermined intervals thereinto.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which:

FIG. 3 is a diagram defining addresses of pixels in a pixel region for convenience of explanation;

FIG. 4 is a diagram for explaining a general method of reading pixel information from a pixel region;

FIG. 5 is a diagram showing how a pixel region is divided into a plurality of sub-regions according to an embodiment of the present invention;

FIG. 6 is a diagram for explaining a readout method in a first exemplary embodiment of an image pickup apparatus according to an embodiment;

FIG. 7 is a diagram illustrating frames generated by a readout method according to a first exemplary embodiment;

FIG. 13 is a diagram for explaining a readout method in a second exemplary embodiment of an image pickup apparatus according to an embodiment;

FIG. 15 shows a minimum unit of a Bayer arrangement of a color filter; and

FIG. 16 is a diagram showing a pixel region generated in a Bayer arrangement.

DETAILED DESCRIPTION OF THE INVENTION

Figure 1:
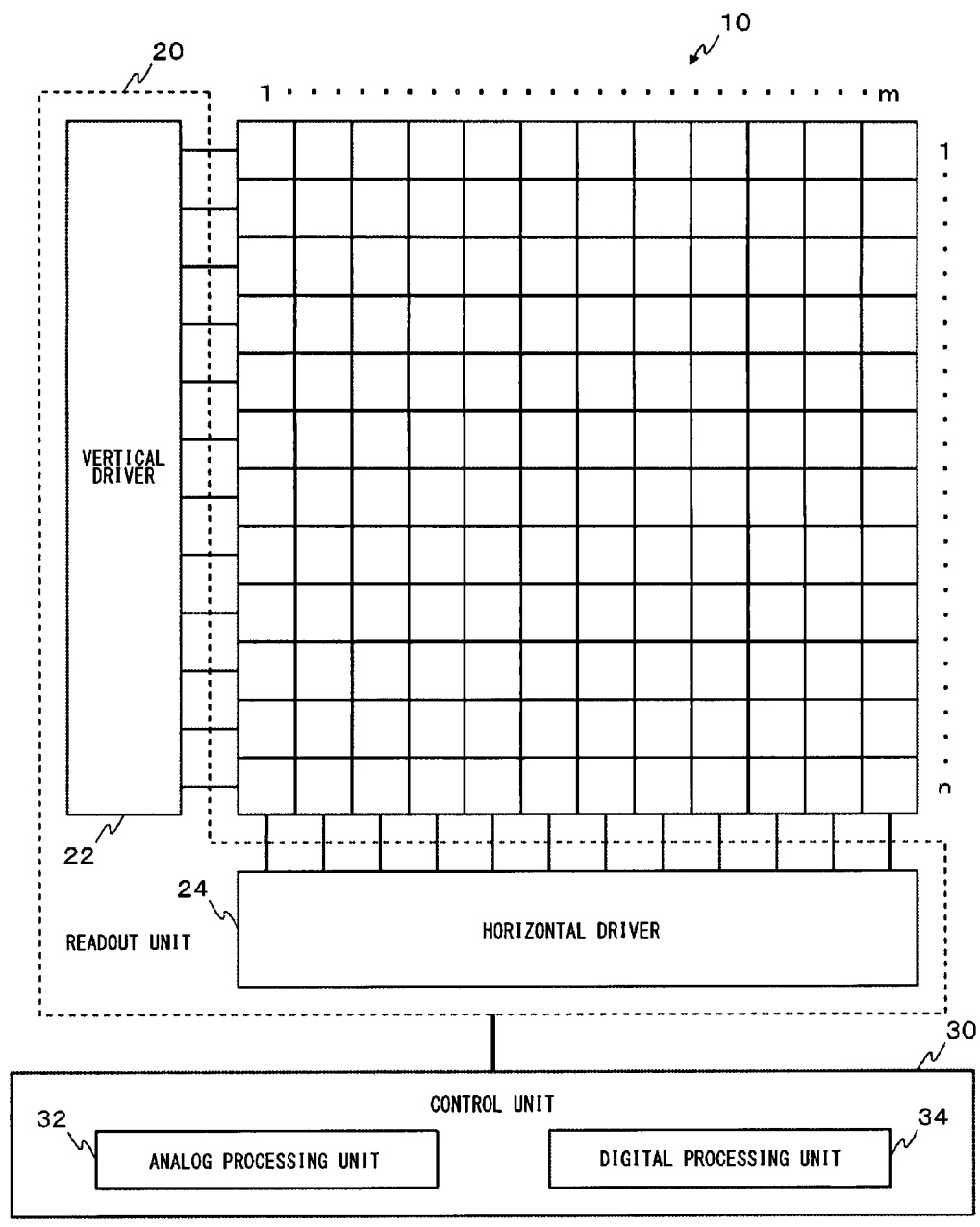
FIG. 1 illustrates a structure of an image pickup apparatus according to an embodiment of the present invention.

The invention will now be described by reference to the preferred embodiments. This does not intend to limit the scope of the present invention, but to exemplify the invention.

Firstly, a description is given of representative modes of carrying out the present invention before explaining the preferred embodiments thereof. In a pixel information readout method according to one embodiment of the present invention, a pixel region, where image pickup devices are arranged two-dimensionally, is divided into a plurality of sub-regions and when image information on the pixel region is successively read out, pixel information on a pixel of interest in each of the sub-regions is successively inserted at predetermined intervals thereinto. In this method, it may be so arranged that the frame rates for the "sub-regions" are different from one another and thus image information is read out from a plurality of sub-regions having different frame rates from one another.

According to this embodiment, information on a whole screen may be acquired from the pixel information on the pixels of interest in their respective sub-regions before all the pixel information of a pixel region are read out, so that image processing parameters necessary for the performance of various adaptive controls can be acquired early. Accordingly, it is possible to realize earlier timing for starting adaptive controls.

Also, a plurality of frames composed of pixel information on the pixels of interest may be generated before the pixel information on an end of the pixel region is read out, by generating a frame by reading out the pixel information on the pixel of interest inserted at predetermined intervals and then again inserting the pixel information on the pixels of interest from a first sub-region. The exposure time for the pixels of interest may be set shorter than that for the other pixels. Such an arrangement may allow the generation of a plurality of frames with low resolution in a single unit of image capture and thus can be used in distortion compensation for a picked-up image of a moving object.

In the pixel region, image pickup devices of multiple colors are arranged regularly, and the vertical and horizontal numbers of pixels for the respective sub-regions may be set in such a manner that pixel information is read out while maintaining the regular arrangement of the pixel region. When the image pickup devices of multiple colors are in a Bayer arrangement, the vertical and horizontal numbers of pixels for the respective sub-regions may be set in odd numbers.

Another embodiment of the present invention relates to an image pickup apparatus. This apparatus includes: a pixel region, where image pickup devices are arranged two-dimensionally; and a readout unit which inserts pixel information on a pixel of interest in each of sub-regions successively at predetermined intervals when pixel information on the pixel region, which is divided into a plurality of sub-regions, is read out successively.

According to this embodiment, information on a whole screen may be acquired from the pixel information on the pixels of interest in their respective sub-regions before all the pixel information on a pixel region are read out, so that image processing parameters necessary for the performance of various adaptive controls can be acquired early. Accordingly, it is possible to realize earlier timing for starting adaptive controls.

The apparatus may further include a control unit, which generates a frame from pixel information on pixels of interest inserted at predetermined intervals. The readout unit may again insert the pixel information on the pixels of interest from the first sub-region after a frame has been generated by the control unit, and the control unit may generate a plurality of frames composed of pixel information on the pixels of interest before the pixel information on an end of the pixel region is read out. The control unit may grasp a tendency of a picked-up image from the generated frames and perform a predetermined adaptive control according to the grasped tendency.

A pixel information readout method according to another embodiment of the present invention is such that a pixel region, where image pickup devices are two-dimensionally arranged, is divided into a plurality of sub-regions, and pixel information on a pixel of interest in each of the sub-regions is read out successively. And the number of pixels constituting a "sub-region" may be changed adaptively. Also, the order of reading the "sub-regions" may be changed adaptively.

According to this embodiment, information on a whole screen may be acquired early from the pixel information on the pixels of interest in their respective sub-regions, and therefore image processing parameters necessary for the performance of various adaptive controls can be acquired early. Hence, it is possible to realize earlier timing for starting adaptive controls.

Also, after a frame is generated by reading out the pixel information from the pixels of interest in their respective sub-regions, the pixels of interest in their respective sub-regions may be changed and a new frame may be generated by reading out the pixel information on the changed pixels of interest successively. Such an arrangement may allow the generation of a plurality of frames in a single unit of image capture and thus can be used, for instance, in distortion compensation for a picked-up image of a moving object.

In the pixel region, image pickup devices of multiple colors are arranged regularly, and the vertical and horizontal numbers of pixels for the respective sub-regions may be set in such a manner that pixel information is read out while maintaining the regular arrangement of the pixel region. When the image pickup devices of multiple colors are in a Bayer arrangement, the vertical and horizontal numbers of pixels for the respective sub-regions may be set in odd numbers.

Still another embodiment of the present invention relates to an image pickup apparatus. This apparatus includes: a pixel region where image pickup devices are arranged two-dimensionally; and a readout unit which reads pixel information on a pixel of interest in each sub-region successively from the pixel region which is divided into a plurality of sub-regions.

According to this embodiment, information on a whole screen can be acquired early from pixel information on the pixels of interest in their respective sub-regions, and therefore image processing parameters necessary for the performance of various adaptive controls can be acquired early. Hence, it is possible to realize earlier timing for starting adaptive controls.

The apparatus may further include a control unit which generates a frame from pixel information on the pixels of interest in their sub-regions which have been read out by the readout unit. The readout unit may change the pixels of interest in their respective sub-regions after a frame has been generated by the control unit, and read out successively pixel information on the changed pixels of interest, and the control unit may generate a new frame from the pixel information on the changed pixels of interest which has been read out by the readout unit. The control unit may grasp a tendency of a picked-up image from the generated frames and perform a predetermined adaptive control according to the grasped tendency.

It is to be noted that any arbitrary combination of the above-described structural components as well as the expressions according to the present invention changed among a method, an apparatus, a system, a computer program, a recording medium containing the computer program and so forth are all effective as and encompassed by the present embodiments.

FIG. 1 illustrates a structure of an image pickup apparatus 100 according to an embodiment of the present invention. The image pickup apparatus 100 includes a pixel region 10, a readout unit 20, and a control unit 30. The pixel region 10 is a matrix where a plurality of image pickup devices, formed by a CMOS process, are two-dimensionally arranged in m columns and n rows (m, n being a natural number).

The readout unit 20, provided with a vertical driver 22 and a horizontal driver 24, reads out pixel information from the pixel region 10 successively. The vertical driver 22 selects a row to be exposed by selecting one of the wirings provided for their respective rows of the pixel region 10. The horizontal driver 24 selects a column from which to read out pixel information, by selecting one of the wirings provided for their respective columns of the pixel region 10. Thus, a specific pixel is selected by the vertical driver 22 and the horizontal driver 24, and pixel information, which is photoelectrically converted by an image pickup device of the pixel, is read out to the control unit 30. The vertical driver 22 and the horizontal driver 24, which are provided with a counter or the like with a not-shown logic circuit, keep selecting rows and columns according to the clock supplied therefrom.

The control unit 30 includes an analog processing unit 32 and a digital processing unit 34. The analog processing unit 32 includes a CDS (Correlated Double Sampler), a variable amplifier, and an analog-to-digital converter, which are all not shown. Pixel information, having been converted into digital signals, is outputted to the digital processing unit 34. The digital processing unit 34 is structured by a DSP (Digital Signal Processor) or the like. Hereinbelow, a detailed description will be given of the digital processing unit 34.

Figure 2:
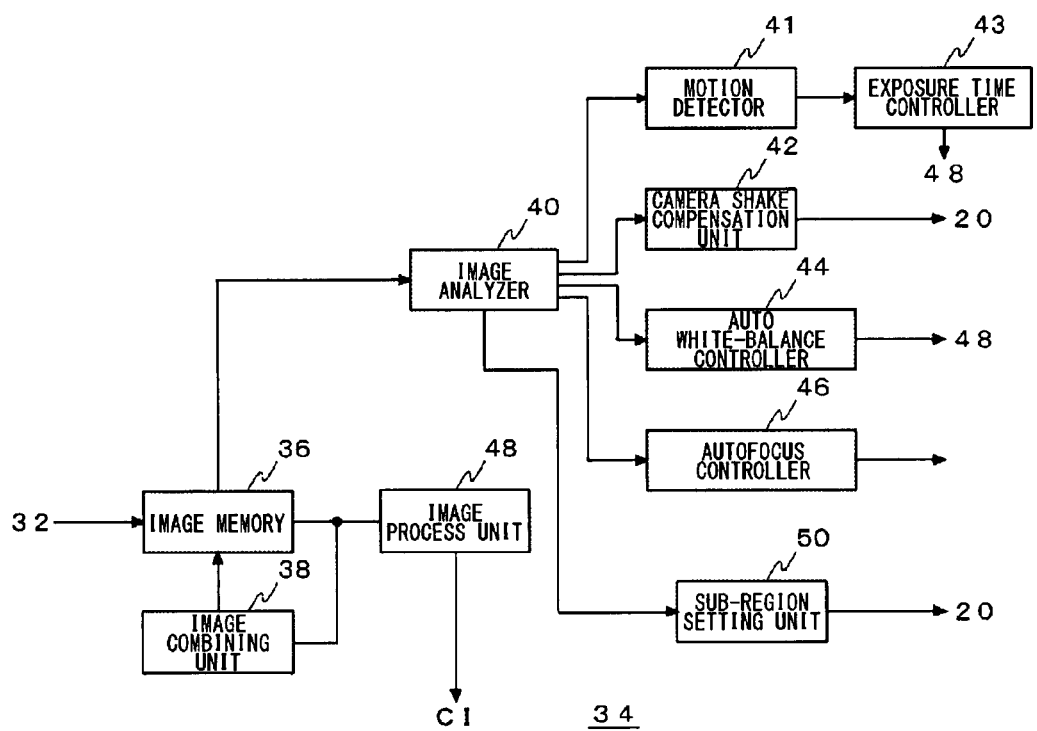
FIG. 2 illustrates a structure of a digital processing unit according to an embodiment of the present invention.

FIG. 2 illustrates a structure of the digital processing unit 34 according to an embodiment of the present invention. The digital processing unit 34 includes an image memory 36, an image combining unit 38, an image analyzer 40, a motion detector 41, a camera shake compensation unit 43, an exposure time controller 42, an auto white-balance controller 44, an autofocus controller 46, an image process unit 48, and a sub-region setting unit 50. In terms of hardware, the structure of the digital processing unit 34 can be realized by any DSP, CPU, memory and other LSIs. In terms of software, it can be realized by memory-loaded programs and the like, but drawn and described herein are function blocks that are realized in cooperation with those. Hence, it is understood by those skilled in the art that these function blocks can be realized in a variety of forms such as by hardware only, software only or the combination thereof.

The image memory 36 temporarily stores pixel information inputted from the analog processing unit 32. The image memory 36 may be structured by a plurality of frame memories. The image combining unit 38 combines pixel information on a frame and that on another frame, which are stored in the image memory 36, and returns the resultant information to the image memory 36. The image analyzer 40 analyzes pixel information regarding a specific frame in the image memory 36 and thereby acquires image processing parameters, which represent a general tendency or characteristics of an entire screen. Since a tendency or characteristics of an entire screen can be grasped even from an image of low resolution, it is possible to acquire image processing parameters from a frame created by pixels of interest in their respective sub-regions, which will be described later. Based on these image processing parameters, the image analyzer 40 controls the motion detector 41, the exposure time controller 42, the auto white-balance controller 44, the autofocus controller 46, and the sub-region setting unit 50. By referring to analysis results of the image analyzer 40, the motion detector 41 detects a camera shake by detecting the motion of an object and the background having taken place between frames. In response to the camera shake detected by the motion detector 41, the camera shake compensation unit 43 compensates the camera shake by shifting the clipping frame of the image or like process.

The exposure time controller 42 controls exposure time for the pixel region 10 by referring to analysis results of the image analyzer 40. That is, the exposure time controller 42 controls the frame rate for the pixel region 10. More specifically, the vertical driver 22 of the readout unit 20 controls the time for accumulating an amount of light by activating the image pickup devices disposed in the pixel region 10. Accordingly, the image analyzer 40 is only required to acquire information for estimating the amount of light from a specific frame stored in the image memory 36 and deliver it to the exposure time controller 42.

The auto white-balance controller 44 adjusts white balance by referring to analysis results of the image analyzer 40. The adjustment of white balance is an adjustment for accurate rendering of white irrespective of differing conditions of color temperature of a light source. Color information on an entire screen may be used as the image processing parameter for the adjustment of white balance. The image analyzer 40 can adjust the white balance by instructing the image process unit 48 to multiply any one or more of the red R, the green G, and the blue B signal by a coefficient derived from an analysis of the color information.

The autofocus controller 46 adjusts focus by referring to analysis results of the image analysis unit 40. To control focus, it is necessary that an object to be focused on be identified and that pixel information on the entire screen be used. That is, the pixel information on an entire screen means information necessary to grasp a tendency of the whole screen, and this pixel information does not necessarily require all of the entire pixel information on the screen. Whether the object is focused on or not can be determined by analyzing the frequency components of the pixel information, and the autofocus controller 46 controls the position of a not-shown lens based on the analysis result.

Not all of these adaptive controllers, namely, the motion detector 41, the exposure time controller 42, the auto white-balance controller 44, and the autofocus controller 46, need to be incorporated, but a designer may optionally select these controllers to be incorporated into the present system. Accordingly, the digital processing unit 34 is only required to include any one or more of the motion detector 41, the exposure time controller 42, the auto white-balance controller 44, and the autofocus controller 46.

The image process unit 48 applies predetermined processing on the pixel information stored in the image memory 36 and outputs it as coded image data CI to an external medium, or does so without applying such processing thereto. For example, such information is outputted to an external recording medium, such as a hard disk or a detachable IC recording medium. Note that the predetermined processing means the above-described white balance adjustment and other general image processings.

The sub-region setting unit 50 refers to analysis results of the image analyzer 40, such as the brightness of the entire screen, and accordingly sets the size and the pixel of interest of each sub-region when dividing the pixel region 10 into a plurality of sub-regions, which will be described later. The sub-region setting unit 50 may also change the number of pixels constituting a sub-region adaptively. For example, it may change the number of pixels constituting a sub-region within an I-frame or for each frame. The sub-region setting unit 50 may also change the order of reading sub-regions adaptively. For example, when the object is in a lower part of the screen, the reading may be started from a sub-region in a lower part of the frame. Such an adaptive setting makes flexible processing possible. Also, it is to be noted that where the size and the pixel of interest of each sub-region are not changed adaptively, there is no need for providing a sub-region setting unit. In such a case, the size and the pixel of interest of each sub-region may be set in advance in the readout unit 20.

FIG. 3 is a diagram defining addresses of pixels in the pixel region 10 for convenience of explanation. Hereinbelow, a description will be given of a case where the pixel region 10 has 144 pixels in a matrix of 12 columns and 12 rows as shown in FIG. 3. Note that the numerals in the pixels are simply addresses for identifying their positions, not indicating the contents of data.

FIG. 4 is a diagram for explaining a general method of reading pixel information from the pixel region 10. Generally, with a CMOS image sensor, pixel information is read out in order from the topmost row of the pixel region 10 to the bottommost row thereof. Also, the pixel information in each row is read out in order from the leftmost to the rightmost pixel thereof. Thus, the pixel information on the pixel region 10 as shown in FIG. 3 is read out in order from the top left pixel to the bottom right pixel thereof. In FIG. 4, therefore, the order of pixels from which pixel information is read out is shown by the above-mentioned addresses assigned for convenience of explanation. The pixel information is read out successively in the same order of address numerals, like address 1, address 2, address 3, and so on.

FIG. 5 is a diagram showing how a pixel region 10 is divided into a plurality of sub-regions according to an embodiment of the present invention. A sub-region is a group of pixels arranged two-dimensionally in x columns and y rows (x, y being 2 or larger natural number) within a pixel region 10, and a plurality of sub-regions are set in the pixel region 10. In FIG. 5, the pixel region 10 is divided into 16 sub-regions, each having 9 pixels in 3 columns and 3 rows.

Each sub-region must be set in a size of 2 columns and 2 rows or larger. The larger the size of each sub-region is, the quicker the tendency and characteristics of a whole picked-up image will be grasped, but this results in the generation of a frame of lower resolution. For a smaller size of each sub-region, the result will be the opposite. Since those factors are in a trade-off relationship, a designer can set a size of each sub-region which is determined through experiment, simulation, or like measure. Also, where a sub-region setting unit 50 is included, the sub-region setting unit 50 may dynamically change the size of each sub-region based on the brightness of an image and other conditions.

FIG. 6 is a diagram for explaining a readout method in a first exemplary embodiment of an image pickup apparatus 100 according to the present embodiment. The readout method in the first exemplary embodiment is such that pixel information on a designated pixel (hereinafter referred to as "pixel of interest") within a sub-region is read out, and then, without reading the other pixels within the sub-region, pixel information on the pixels of interest in the subsequent sub-regions is read out successively.

Firstly, a pixel of interest in each sub-region is designated in the center thereof. The pixel of interest in the first sub-region S1 set at top left of the pixel region 10 is designated as address 14 in the center thereof. The readout unit 20 reads the pixels of interest in all the sub-regions successively. That is, pixel information at address 14 in the first sub-region S1 is read out, then pixel information at address 17 in the next sub-region on the right, and finally pixel information at address 131 in the bottom right sub-region. With the readout done this far, the control unit 30 can acquire an image of the entire image pickup region. The image thus acquired, though it is of low resolution, is good enough for the grasp of a tendency or characteristics of the whole image.

Next, the pixels of interest in their respective sub-regions are changed. In FIG. 6, the top leftmost pixel in each sub-region is designated as a pixel of interest. In a similar manner, the readout unit 20 reads the pixels of interest in all the sub-regions successively. That is, pixel information is read out successively from address 1 in the first sub-region S1 to address 118 in the bottom rightmost sub-region. Following this, pixel information on the pixels of interest in all the sub-regions is read out in a similar manner, before the pixels of interest are again changed and the pixel information is read out successively. With a CMOS image sensor, random access as described above can be performed easily by adjusting logic circuits in the vertical driver 22 and the horizontal driver 24, respectively. In other words, the vertical driver 22 and the horizontal driver 24 can select designated addresses randomly.

FIG. 7 is a diagram illustrating frames generated by a readout method according to the first exemplary embodiment. The first frame f1 is a frame generated by designating the pixel in the center of each sub-region as a pixel of interest and combining pixel information on the pixels of interest in all the sub-regions. Similarly, the second frame f2 is a frame generated by designating the pixel at top left of each sub-region as a pixel of interest and combining pixel information on the pixels of interest in all the sub-regions. Since each sub-region is made up of 9 pixels, a single unit of image pickup using the pixel region 10 can generate 9 frames if the frames are generated in a manner as described above.

The image combining unit 38 combines the image of each frame in order, using the image memory 36. More specifically, the pixel information on a newly generated frame is interpolated among pixels of a current frame. Synthesis with a new frame results in a stepwise improvement in resolution. When the ninth frame f9 is added in the synthesis, the resultant image has the same resolution as that with which an image for the pixel region 10 has primarily been picked up.

Figure 8A:
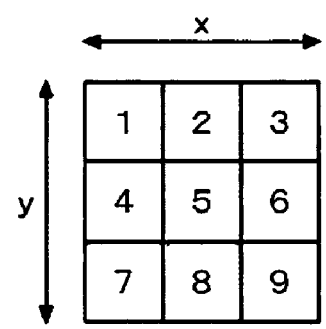
FIGS. 8A and 8B are diagrams each showing the order of reading pixel information from a sub-region.
Figure 8B:
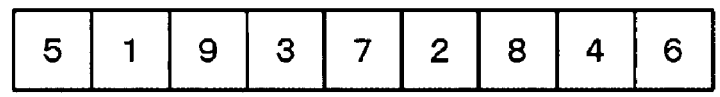

FIGS. 8A and 8B are diagrams each showing the order of reading pixel information on a sub-region. FIG. 8A shows a sub-region having 9 pixels in 3 columns and 3 rows, where the pixels thereof are assigned their respective addresses for convenience of explanation. FIG. 8B shows the order of reading pixel information on the sub-region in terms of addresses. In the example of FIGS. 8A and 8B, pixel information is first read out from address 5, which is located in the center of the sub-region, and then diagonally from the other addresses in the order of address 1, address 9, address 3 and address 7. Finally, pixel information is read out from the remaining addresses in the order of address 2, address 8, address 4, and address 6.

It is to be noted that this reading order, namely, the setting order of pixels of interest, may be arbitrarily set. For example, the characteristics of human vision may be taken into consideration, so that pixel information may be read out horizontally, which is the direction with higher sensitivity. More specifically, pixel information may be read out in the order of address 1, address 2, address 3, address 7, address 8, address 9, address 4, and address 6 after reading out pixel information on address 5, which is in the center. Also, the readout may be done simply in a sequential order from address 1.

Figure 9A:
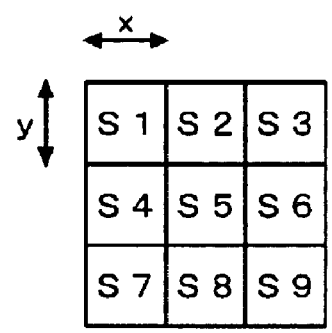
FIGS. 9A and 9B are diagrams each showing an assigned order of a plurality of sub-regions when reading pixel information.
Figure 9B:
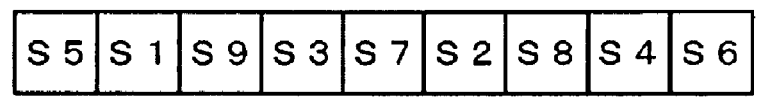

FIGS. 9A and 9B are diagrams each showing an assigned order of a plurality of sub-regions when reading pixel information therefrom. FIG. 9A shows a pixel region 10 divided into 9 sub-regions, which are given their respective numerals for convenience of explanation. FIG. 9B shows the assigned order of the sub-regions in numeral codes. In the example of FIGS. 9A and 9B, assignment is first given to the fifth sub-region S5, which is located in the center of the pixel region, and then diagonally to the first sub-region S1, the ninth sub-region S9, the third sub-region S3, and the seventh sub-region S7. And, finally, assignment is given to the remaining sub-regions in the order of the second sub-region S2, the eighth sub-region S8, the fourth sub-region S4, and the sixth sub-region S6. In each sub-region, pixel information on the pixel of interest is read out in response to the assignment. Note that the description of the order of reading pixel information in a sub-region as given with FIGS. 8A and 8B applies to the order of assigning sub-regions also.

As described hereinabove, according to the first exemplary embodiment, it is possible to realize earlier timing for starting various adaptive controls, such as exposure time control, by dividing a pixel region 10 into a plurality of sub-regions and quickly generating an image for the entire image pickup region based on the pixels of interest in their respective sub-regions. In other words, an image thus generated is of low resolution but is an image for the entire image pickup region, so that a tendency or characteristics of the whole image can be grasped therefrom and various controls can be performed based thereon. This is in contrast to the conventional method of successively reading the entire image pickup region, which takes several times more of time than the present exemplary embodiment to grasp a tendency or characteristics of a whole image. In particular, the advantageous effect of this improvement is significant for image pickup in a dark place, where an insufficient amount of light requires a longer exposure time and therefore a longer time to grasp a tendency or characteristics of a whole image.

The present embodiment can also reduce distortion of a moving object which results from the use of a rolling shutter system. This advantage will be described in more detail below.

Figure 10:
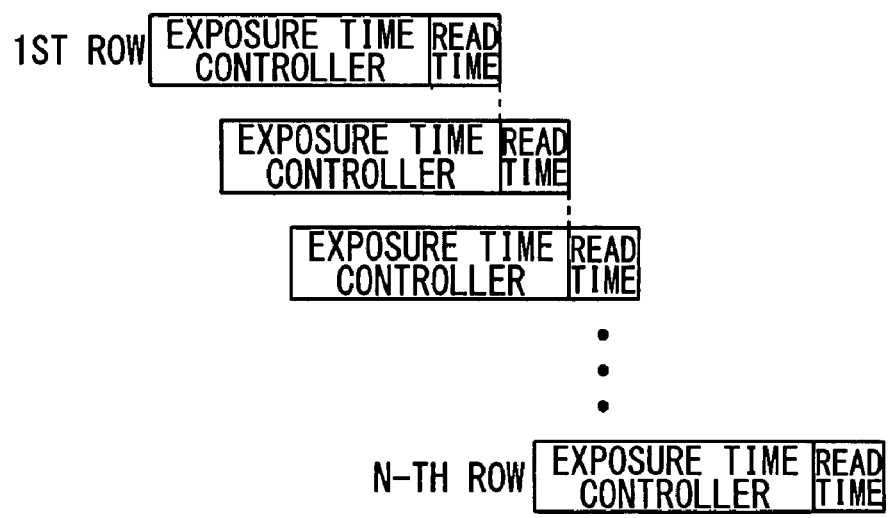
FIG. 10 is an illustration for explaining a rolling shutter system.

FIG. 10 is an illustration for explaining a rolling shutter system. The rolling shutter system, in which the shutter is released successively for each scanning line, features simple sensor structure and great potential for integration. Since the shutter is released successively for each scanning line, the timing for exposure start varies from row to row of the pixel region. As shown in FIG. 10, the start timing of exposure time for each row is successively delayed so that the read times of pixel information in different rows do not coincide with each other. This is necessitated because the exposure time in different rows must be constant.

Figure 11A:
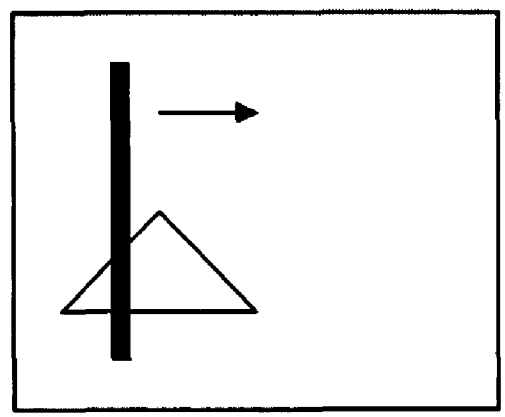
FIGS. 11A and 11B are illustrations for explaining a distortion of an object in motion that occurs with a rolling shutter system.
Figure 11B:
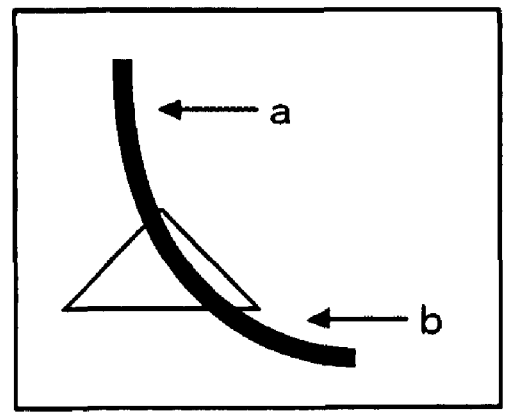

FIGS. 11A and 11B are illustrations for explaining a distortion of an object in motion that can occur with a rolling shutter system. FIG. 11A shows objects. FIG. 11B shows an image having captured the objects. In FIG. 11A, a triangular object is stationary. A bar-like object is moving to the right. As shown in FIG. 11B, if an object in motion is captured by a rolling shutter system, there will be a distortion of the object due to a difference in exposure start timing between the upper part and the lower part of the screen. That is, the exposure start timing for the upper part a of the bar-like object in motion comes early and that for the lower part b thereof late, so that the image of the lower part of the bar-like object is captured distorted in the moving direction.

Figure 12A:
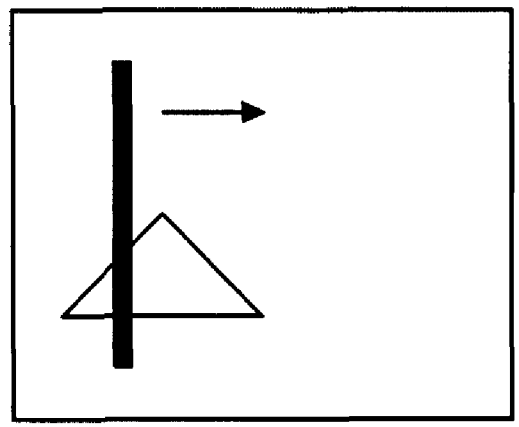
FIGS. 12A and 12B are illustrations for explaining a distortion of an object in motion that occurs with a readout system according to a first exemplary embodiment.
Figure 12B:
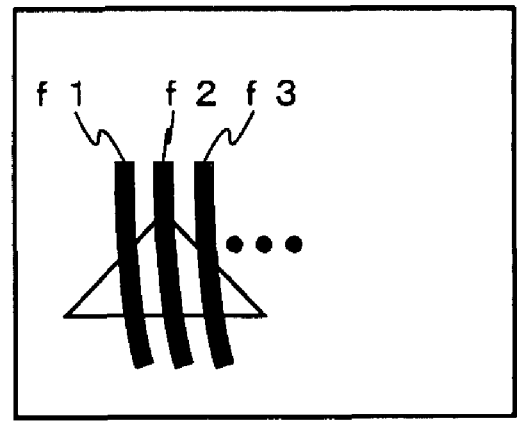

FIGS. 12A and 12B are illustrations for explaining a distortion of an object in motion that can occur with a readout system according to the present exemplary embodiment. FIG. 12A shows objects. FIG. 12B shows an image having captured the objects. FIG. 12A is the same as FIG. 11A which has been described. As explained already, the readout method of the present exemplary embodiment generates a plurality of frames in a unit of image pickup. FIG. 12B shows an image of a plurality of frames as explained in FIG. 7 superposed upon each other. FIG. 12B shows bar-like objects captured in three of the nine frames, namely, the first frame f1, the second frame f2, and the third frame f3. Due to the difference in exposure start timing between the frames, there are displacements of the objects in the moving direction as the frames progress. In FIG. 12B, the displacements are depicted large for easier understanding, but actual displacements are extremely small.

In comparison with FIG. 11B, it is apparent that the distortion of the form of the object is drastically reduced. This is because the difference in exposure start timing between the upper part and the lower part of the object in each frame can be made smaller. When an object in motion is captured, the image analyzer 40 can estimate the distortion by referring to a plurality of frames obtained by the aforementioned process and set the amount of compensation in the image process unit 48 to correct the distortion. A common compensation algorithm may be used for this purpose. The image analyzer 40 may instruct the image combining unit 38 to generate an image without adding a frame with large distortion or using frames with smaller distortions only. A similar process can also be used when a distortion has resulted from a camera shake.

FIG. 13 is a diagram for explaining a readout method in a second exemplary embodiment of an image pickup apparatus 100 according to the present embodiment. The readout method in the second exemplary embodiment is such that when pixel information on a pixel region 10 is read out successively, the readout of pixel information on the pixels of interest in their respective sub-regions is inserted successively at predetermined intervals. Similarly to the setting of the size for each sub-region, the designer can set a predetermined interval through experiment, simulation, or like measure. This interval may also be controlled adaptively by the sub-region setting unit 50.

Division of a pixel region 10 into a plurality of sub-regions and setting a pixel of interest in each of the sub-regions are the same as those in the first exemplary embodiment. In this second exemplary embodiment, too, a description will be given of a case where a pixel region 10 is divided into 16 sub-regions, which has each 9 pixels in 3 columns and 3 rows, and a pixel in the center of each sub-region is designated as a pixel of interest. In FIG. 13, the readout unit 20 reads out pixel information successively from address 1 to address 144 in the pixel region 10. And pixel information on the pixels of interest in their respective sub-regions is read out and inserted once every three pixels into a stream of such pixel information. The pixel information on a pixel of interest to be inserted is also changed successively.

In FIG. 13, the readout unit 20 reads out pixel information successively from address 1, address 2, and address 3 and then pixel information from address 14, which is the pixel of interest in the first sub-region S1. Next, it reads out pixel information successively from address 4, address 5, and address 6 and then pixel information from address 17, which is the pixel of interest in the 2nd sub-region S2. Also, arriving at a pixel of interest in a sub-region while reading out pixel information by successively switching addresses, the readout of the pixel information on the address of the pixel of interest hit is skipped. For example, address 13 is normally followed by address 14, but address 14 is a pixel of interest. Therefore, the pixel is skipped, and pixel information on address 15 is read out instead.

In the present exemplary embodiment, the number of sub-regions is 16, and pixel information on the pixels of interest is read out once every three pixels, so that a frame composed of pixel information on the pixels of interest is completed when the readout unit 20 has read out pixel information on the pixel next to that on address 48. With this frame completed, a return is made to the first sub-region and pixel information is again inserted from the pixel of interest. Accordingly, four frames composed of pixel information on the pixels of interest are completed when the readout unit 20 has read out pixel information on the pixel next to that on address 144, which is the final address of the pixel region 10. Since the pixels of interest in their respective sub-regions are read more frequently than the other pixels, the exposure time for the pixels of interest is set shorter than that for the other pixels. In the above example, the exposure time for the former is set at ¼ of that for the latter. That is, the frame rate for the pixels of interest in their respective sub-regions is set higher than that for the other pixels.

Figure 14:
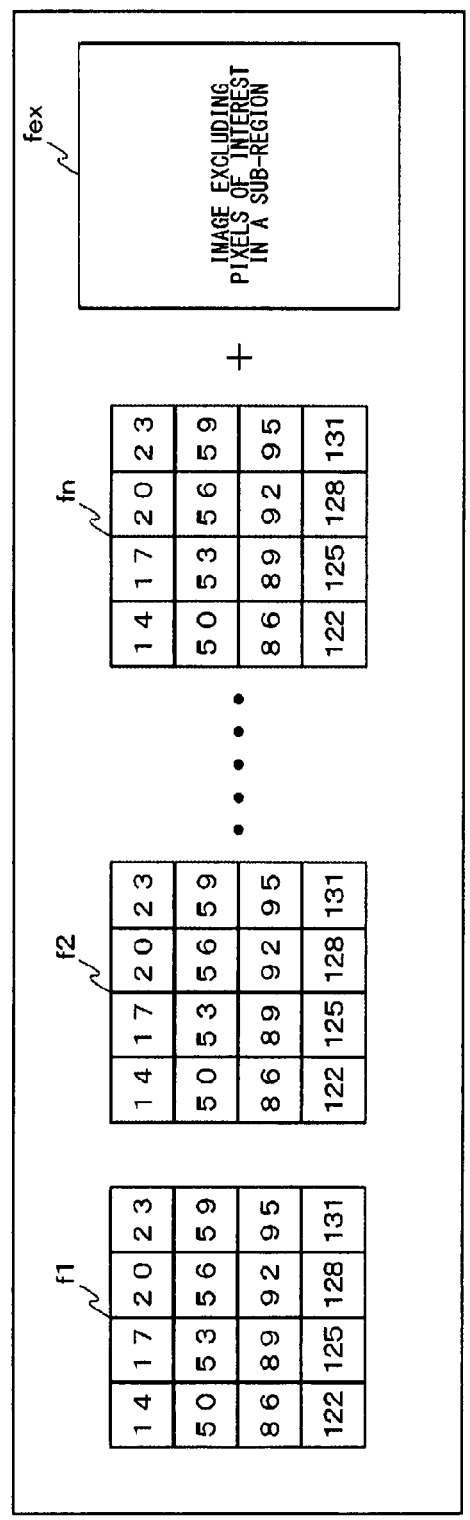
FIG. 14 illustrates frames generated by a readout method according to a second exemplary embodiment.

FIG. 14 illustrates frames generated by a readout method according to the second exemplary embodiment. In a unit of image pickup, a plurality of frames of a resolution lower than the designed or preset resolution for the image pickup region and a frame fex for an image, excluding the pixels of interest, having a resolution equal to the designed or preset resolution are generated. The frame fex for an image excluding the pixels of interest, for which a longer exposure time can be used than for the pixels of interest, has lower noise than a frame formed by the pixels of interest.

The image combining unit 38, by using the image memory 36, can add up the pixel information on a plurality of frames formed by pixel information on the pixels of interest and interpolate the added-up frame into the frame fex for an image excluding the pixels of interest. Note also that pixel information that allows estimation of surrounding pixel information may be interpolated for the pixel of interest in the frame fex for an image excluding the pixels of interest.

As described hereinabove, according to the second exemplary embodiment, in the same manner as the first exemplary embodiment, it is possible to realize earlier timing for starting various adaptive controls, such as exposure time control, by dividing a pixel region 10 into a plurality of sub-regions and quickly generating an image for the entire image pickup region based on the pixels of interest in their respective sub-regions.

Also, distortion of a moving object can be reduced by using a plurality of frames formed by the pixels of interest in their respective sub-regions which have been obtained by the aforementioned processing. As explained in connection with FIG. 12, when an object in motion is captured, the image analyzer 40 can estimate the distortion by referring to a plurality of frames formed by the pixels of interest in their respective sub-regions and set the amount of compensation in the image process unit 48 to correct the distortion. Also, the image analyzer 40 may instruct the image combining unit 38 to generate an image without adding a frame with large distortion or using frames with smaller distortions only.

Further, the plurality of frames formed by the pixels of interest in their respective sub-regions obtained by the aforementioned processing have the characteristics that the exposure time is shorter than that for the other pixels and the image pickup devices do not easily saturate. Thus an image with clear contrast can be generated by combining a frame suited for bright images, which is formed by the pixels of interest, and a frame suited for dark images because of its high sensitivity, which is formed by the pixels excluding the pixels of interest.

Now a description will be given of a readout method in a third exemplary embodiment of an image pickup apparatus 100 according to the present embodiment. The third exemplary embodiment relates to a case where a pixel region 10 is made up of a single plate of color image pickup devices.

Figure 15:
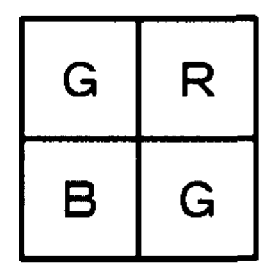

FIG. 15 shows a minimum unit of a Bayer arrangement of a color filter. The minimum unit of a Bayer arrangement is composed of four pixels. Green G image pickup devices are disposed diagonally, and red R and blue B image pickup devices are disposed in the remaining pixels.

Figure 16:
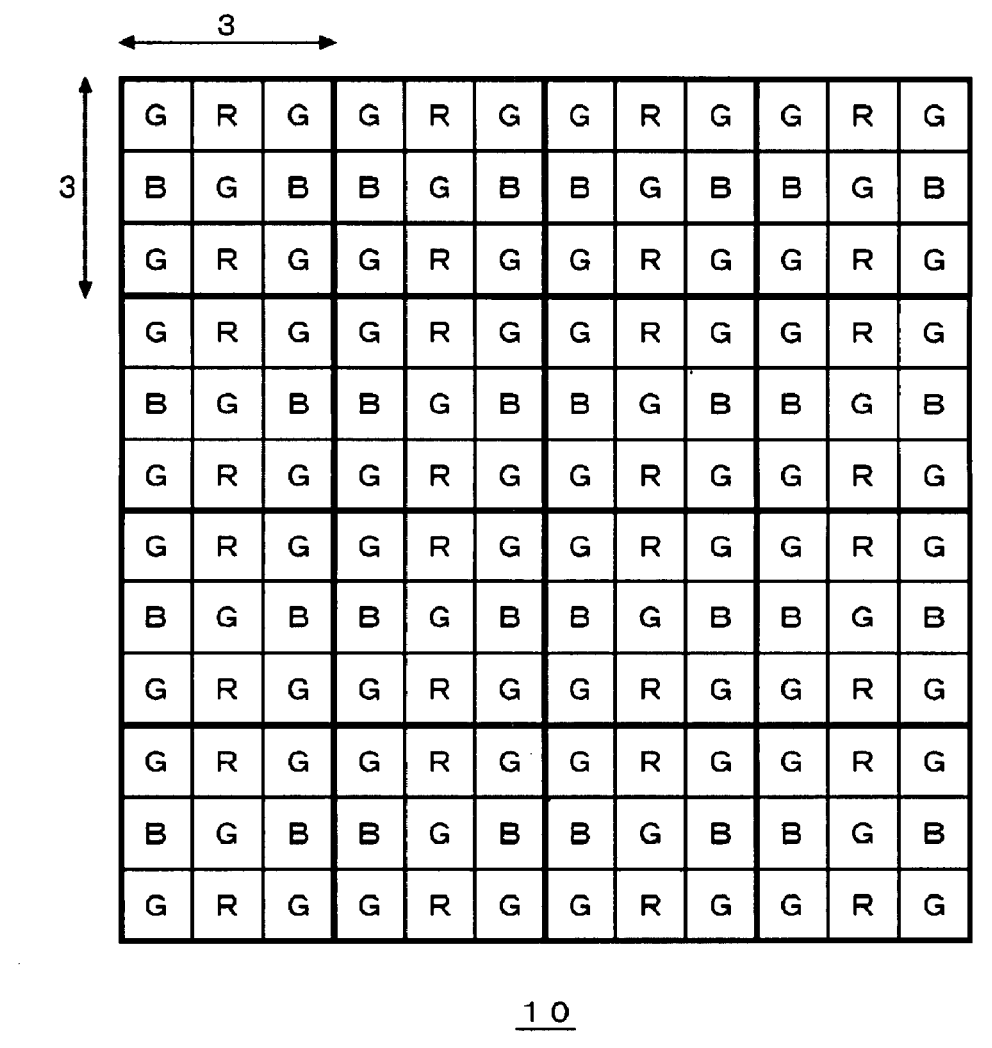

FIG. 16 is a diagram showing a pixel region 10 generated in a Bayer arrangement. If a pixel region 10 is generated by arranging the minimum units of Bayer arrangement as shown in FIG. 15, there will be a row where the green G and the red R image pickup device alternate with each other repeatedly and a row where the green G and the blue B image pickup device alternate with each other repeatedly, and these two types of rows alternate with each other. In this manner, a pixel region 10 in a Bayer arrangement presents a regular arrangement.

Similar to the first exemplary embodiment and the second exemplary embodiment, the pixel region 10 shown in FIG. 16 is a case where it is divided into 16 sub-regions, each of which having 9 pixels in 3 columns and 3 rows. Here, it is preferable that the number of vertical and horizontal pixels, namely, the number of column- and row-direction pixels, of a sub-region be an odd number. If an odd number of vertical and horizontal pixels is set for each sub-region and pixel information is read out by a readout method as explained in the first or the second exemplary embodiment, a frame with the same regular arrangement as the pixel region 10 will be generated, where the green G and the red R or the green G and the blue B alternate with each other. In this connection, it is to be noted that setting an even number of vertical and horizontal pixels for each sub-region will result in a generation of a frame with one and the same color.

As described hereinabove, according to the third exemplary embodiment, the readout method of the first and the second exemplary embodiment can be easily extended to the color image, and the similar effects as explained in the first and the second exemplary embodiment can be obtained with the color image.

The present invention has been described based on some preferred embodiments. These embodiments are merely exemplary, and it is understood by those skilled in the art that various modifications to the combination of each component and each process thereof are possible and that such modifications are also within the scope of the present invention.

For example, in the foregoing preferred embodiments, a description has been given of exposure time control, auto white-balance control, and autofocus control as examples of adaptive controls. Yet, as another adaptive control, the gain of a variable amplifier to be incorporated in the analog processing unit 32 may be adjusted.

Also, a description has been given of a Bayer arrangement as an arrangement for the color filter. This can also be applied to the case where the red R, green G, and blue B image pickup devices are arranged regularly.

While the preferred embodiments of the present invention have been described using specific terms, such description is for illustrative purposes only, and it is to be understood that changes and variations may be further made without departing from the spirit or scope of the appended claims.

What is claimed is:

1. A pixel information readout method comprising the steps of:
    dividing a pixel region, where image pickup devices are arranged two-dimensionally, into a plurality of sub-regions; and
    when image information on all pixels included in the pixel region is read out in the order of arrangement, successively inserting pixel information on each pixel of interest in the plurality of sub-regions in a stream of image information thus read out at predetermined intervals thereinto, wherein
    each sub-region includes pixels arranged in x columns and y rows, where x and y are integers equal to or greater than two, and
    a pixel of interest is set in each sub-region.

2. A pixel information readout method according to claim 1, wherein a plurality of frames composed of pixel information on the pixel of interest are generated before the pixel information on an end of the pixel region is read out, by generating a frame by reading the pixel information on the pixel of interest inserted at predetermined intervals and then again inserting the pixel information on the pixel of interest from a first sub-region.

3. A pixel information readout method according to claim 2, wherein exposure time for the pixel of interest is set shorter than that for the other pixels.

4. A pixel information readout method according to claim 2, wherein image pickup devices of a plurality of colors are arranged regularly in the pixel region, and the numbers of pixels in vertical and horizontal directions for the respective sub-regions is set in such a manner that the pixel information is read while maintaining the regular arrangement of the pixel region.

5. A pixel information readout method according to claim 1, wherein exposure time for the pixel of interest is set shorter than that for the other pixels.

6. A pixel information readout method according to claim 1, wherein image pickup devices of a plurality of colors are arranged regularly in the pixel region, and the numbers of pixels in vertical and horizontal directions for the respective sub-regions are set in such a manner that the pixel information is read out while maintaining the regular arrangement of the pixel region.

7. An image pickup apparatus, comprising:
a pixel region where image pickup devices are arranged two-dimensionally; and
a readout unit which reads out image information on all pixels included in the pixel region in the order of arrangement, wherein
the pixel region is divided into a plurality of sub-regions,
when reading out the image information on all pixels included in the pixel region in the order of arrangement, the readout unit successively inserts pixel information on each pixel of interest in the plurality of sub-regions in a stream of image information thus read out at predetermined intervals,
each sub-region includes pixels arranged in x columns and y rows, where x and y are integers equal to or greater than two, and
a pixel of interest is set in each sub-region.

8. An image pickup apparatus according to claim 7, further comprising a control unit which generates a frame from the pixel information on a pixel of interest inserted at predetermined intervals and read out from said readout unit,
wherein said control unit grasps a tendency of a picked-up image from the generated frame and performs a predetermined adaptive control according to the grasped tendency.

9. A pixel information readout method for reading out pixel information on all pixels included in a pixel region, where image pickup devices are two-dimensionally arranged, wherein
the pixel region is divided into a plurality of sub-regions, and
a series of steps that are repeated, including generating a frame by successively reading out pixel information on pixels at respective positions specified in the plurality of sub-regions, and then, when the frame has been generated, changing the positions, so as to generate a number of frames corresponding to the number of pixels included in the sub-region and to interpolate the plurality of frames, thereby generating a frame composed of each of the pixels included in the pixel region,
the plurality of sub-regions are arranged in m columns and n rows, where m and n are integers equal to or greater than two, and
each sub-region includes pixels arranged in x columns and y rows, where x and y are integers equal to or greater than three.

10. A pixel information readout method according to claim 9, wherein
the image pickup devices are rolling shutter devices, and
the method comprises estimating the distortion of an object in an image by referring to a plurality of frames generated for each pixel information read out in the series of steps, and correcting the distortion accordingly.

11. A pixel information readout method according to claim 10, wherein image pickup devices of a plurality of colors are arranged regularly in the pixel region, and the numbers of pixels in vertical and horizontal directions for the respective sub-regions are set in such a manner that pixel information is read out while maintaining the regular arrangement of the pixel region.

12. A pixel information readout method according to claim 9, wherein image pickup devices of a plurality of colors are arranged regularly in the pixel region, and the numbers of pixels in vertical and horizontal directions for the respective sub-regions are set in such a manner that pixel information is read out while maintaining the regular arrangement of the pixel region.

13. An image pickup apparatus, comprising:
a pixel region, where image pickup devices are arranged two-dimensionally; and
a readout unit which successively reads pixel information on all pixels included in the pixel region, wherein
the pixel region is divided into a plurality of sub-regions,
the readout unit repeats a series of steps including generating a frame by successively reading out pixel information on pixels at respective positions in the plurality of sub-regions, and, then, when the frame has been generated, changing the positions, so as to generate a number of frames corresponding to the number of pixels included in the sub-region and to interpolate the plurality of frames thereby generating a frame composed of each of the pixels included in the pixel region,
the plurality of sub-regions are arranged in m columns and n rows, where m and n are integers equal to or greater than two, and
each sub-region includes pixels arranged in x columns and y rows, where x and y are integers equal to or greater than three.

14. An image pickup apparatus according to claim 13, wherein the image pickup devices are rolling shutter devices, and the apparatus comprises:
an image analyzer which estimates the distortion of an object in an image by referring to a plurality of frames generated for each pixel information read out in the series of steps; and
an image process unit which corrects the distortion estimated by the image analyzer.

15. An image pickup apparatus, comprising:
a pixel region, where image pickup devices are arranged two-dimensionally;
a readout unit which successively reads pixel information on all pixels included in the pixel region; and
a control unit which generates a frame from the pixel information on read out by said readout unit in a single series of said steps, wherein
the pixel region is divided into a plurality of sub-regions,
the readout unit repeats a series of steps including successively reading out pixel information on pixels at respective positions in the plurality of sub-regions, and then, when the pixel information on the pixels has been read out, changing the positions, thereby reading out the pixel information on the entire of pixels included in the pixel region,
the plurality of sub-regions are arranged in m columns and n rows, where m and n are integers equal to or greater than two, and
each sub-region includes a group of pixels arranged in x columns and y rows, where x and y are integers equal to or greater than three, and
wherein said control unit grasps a tendency of a picked-up image from a generated frame and performs a predetermined adaptive control according to the grasped tendency.

* * * * *